Figure 1:
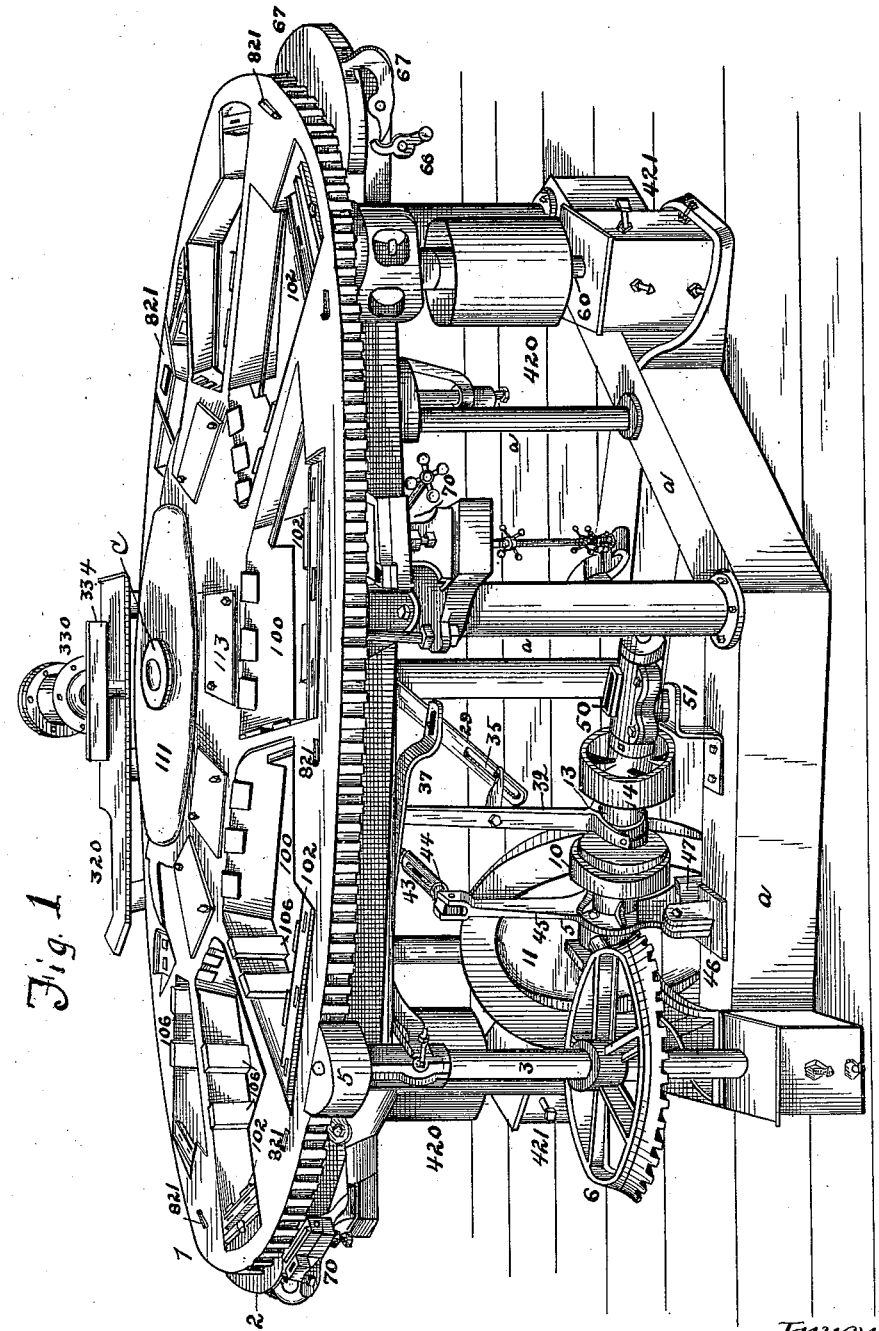

(No Model.)  13 Sheets—Sheet 1.

W. J. PERKINS.
SHINGLE SAWING MACHINE.

No. 561,281.  Patented June 2, 1896.

Witnesses:

Inventor:
W. J. Perkins
By W. H. Bartlett
Atty.

(No Model.) 13 Sheets—Sheet 2.

W. J. PERKINS.
SHINGLE SAWING MACHINE.

No. 561,281. Patented June 2, 1896.

Attest:
J. G. Lepper
O. W. Johnson

Inventor:
W. J. Perkins
By W. H. Bartlett
Atty.

(No Model.) 13 Sheets—Sheet 3.
W. J. PERKINS.
SHINGLE SAWING MACHINE.

No. 561,281. Patented June 2, 1896.

Attest:
J. G. Lepper
W. Johnson

Inventor:
W. J. Perkins
By W. H. Bartlett
Atty.

(No Model.) 13 Sheets—Sheet 4.
W. J. PERKINS.
SHINGLE SAWING MACHINE.
No. 561,281. Patented June 2, 1896.
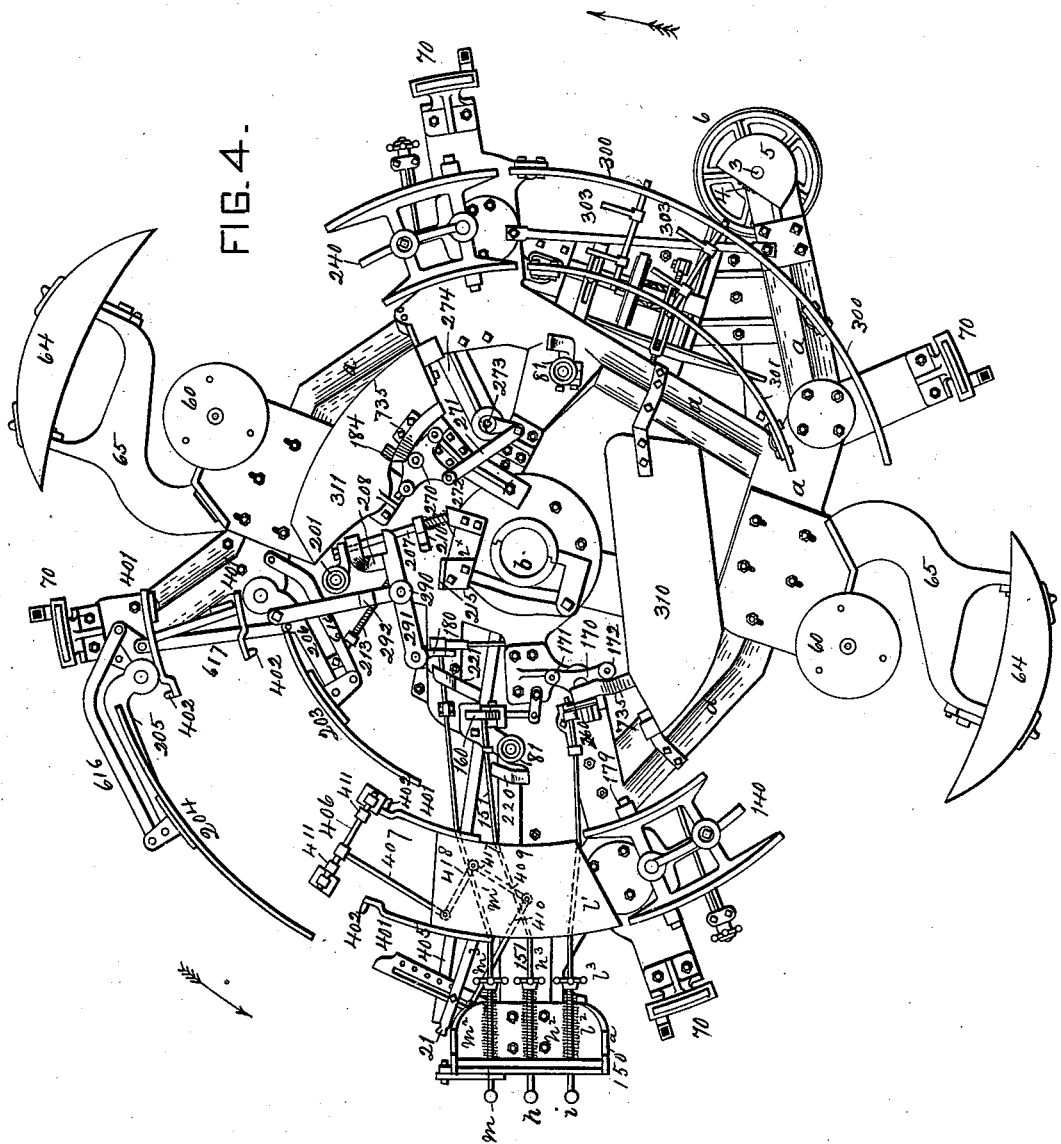
Attest:
J. G. Lepper.
N. W. Johnson.
Inventor:
W. J. Perkins
By W. H. Bartlett
Att'y.

(No Model.) 13 Sheets—Sheet 5.

W. J. PERKINS.
SHINGLE SAWING MACHINE.

No. 561,281. Patented June 2, 1896.

Attest:
J. G. Lepper
W. Johnson

Inventor:
W. J. Perkins
By W. A. Bartlett
Atty.

(No Model.) 13 Sheets—Sheet 7.
W. J. PERKINS.
SHINGLE SAWING MACHINE.
No. 561,281. Patented June 2, 1896.
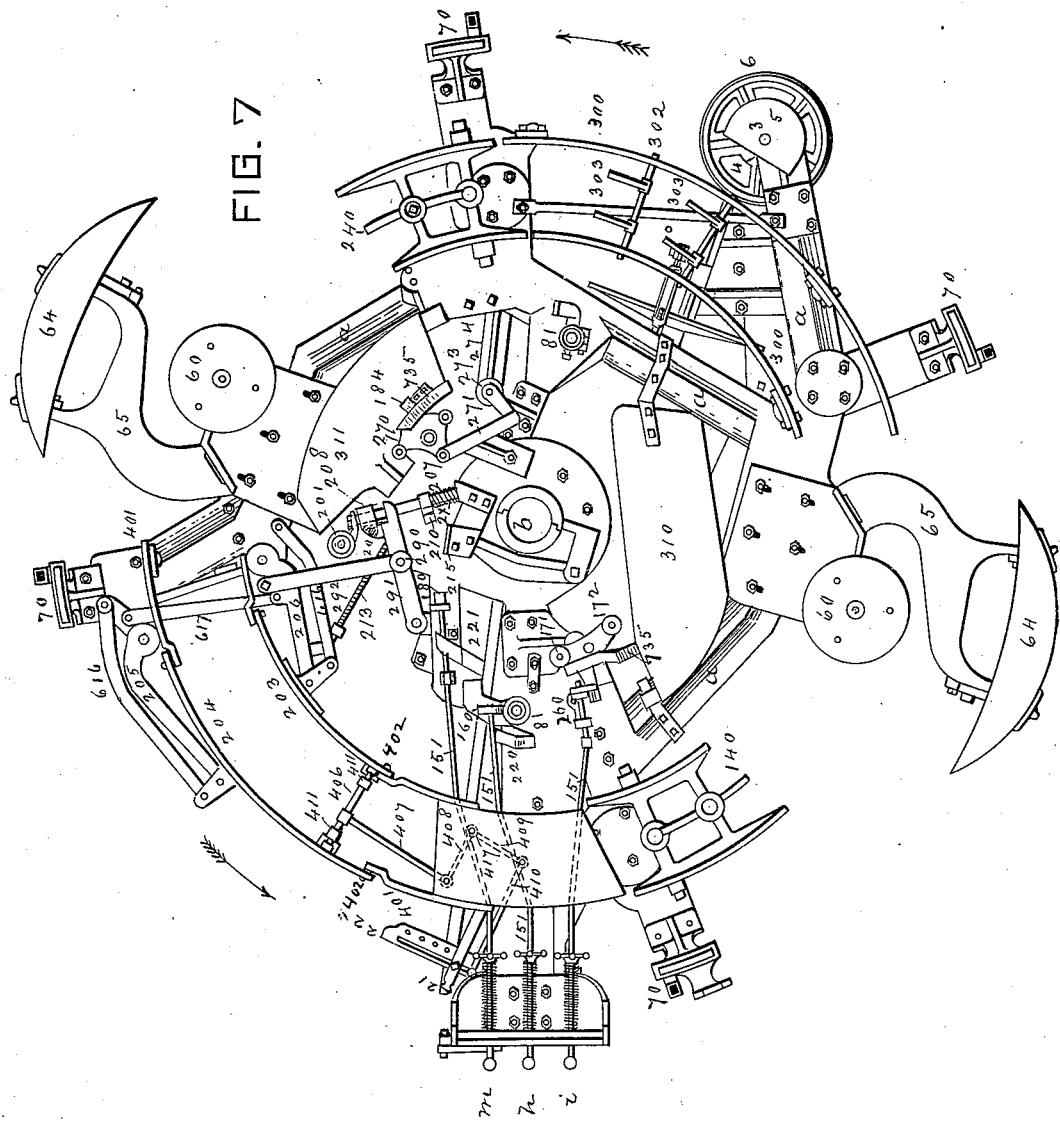
Attest:
J. G. Lepper
M. W. Johnson
Inventor:
W. J. Perkins
By W. H. Bartlett
Att'y.

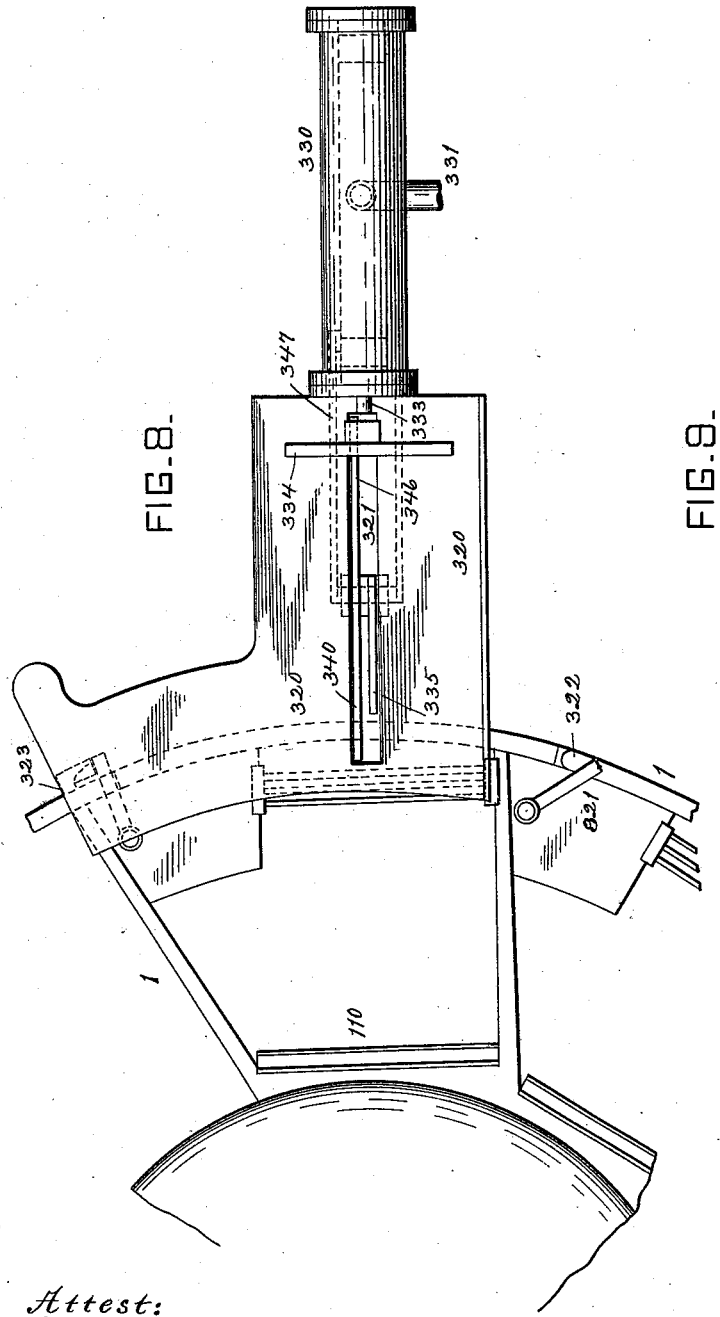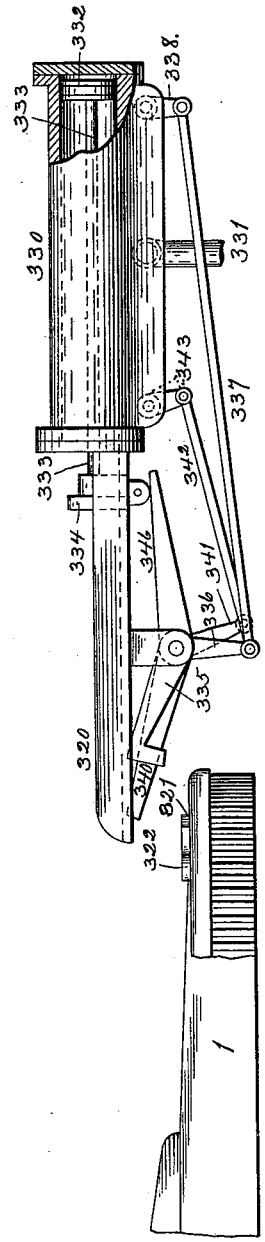

(No Model.) 13 Sheets—Sheet 9.

W. J. PERKINS.
SHINGLE SAWING MACHINE.

No. 561,281. Patented June 2, 1896.

Attest:
J. G. Lepper
O. W. Johnson

Inventor:
W. J. Perkins
By W. A. Bartlett
Att'y.

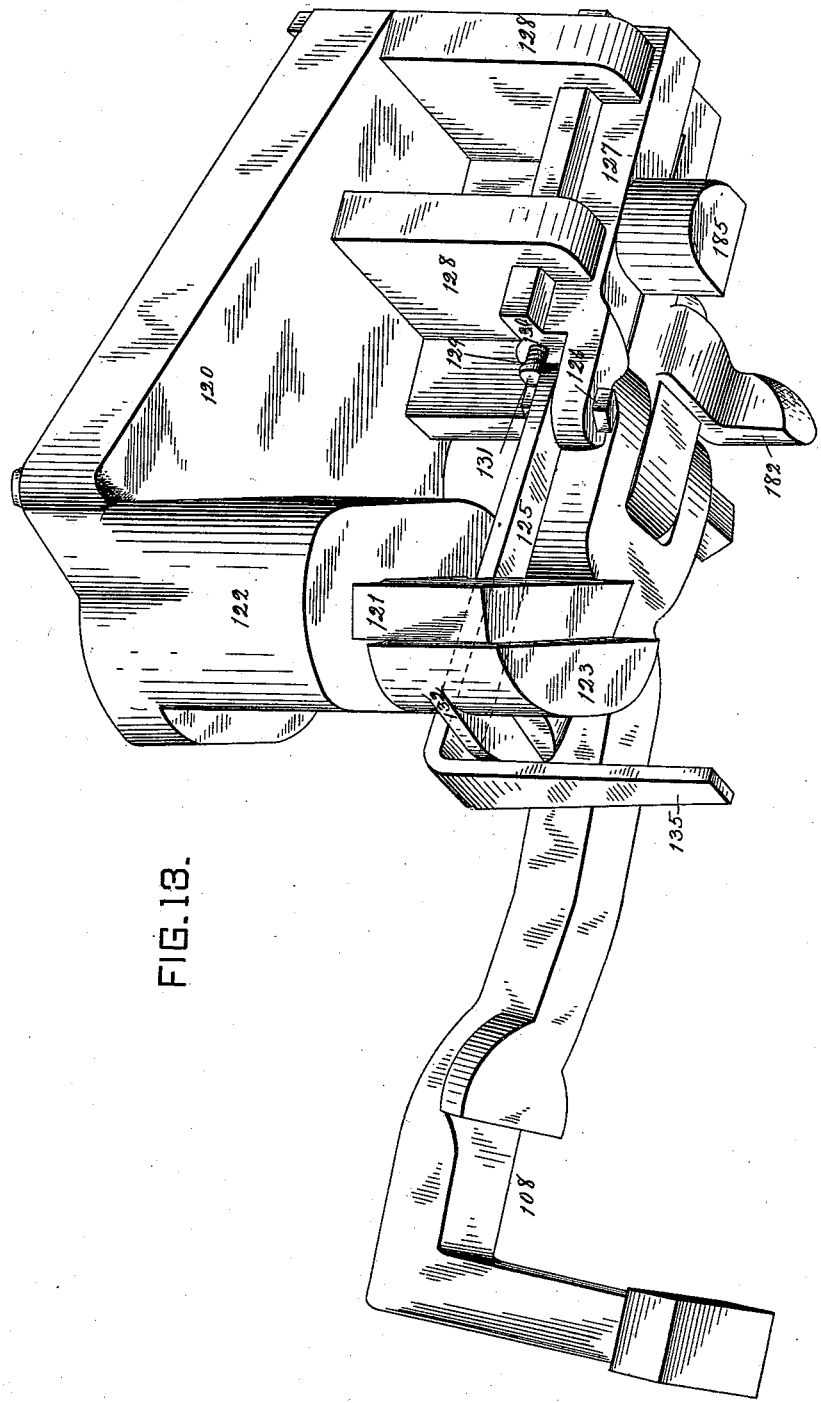

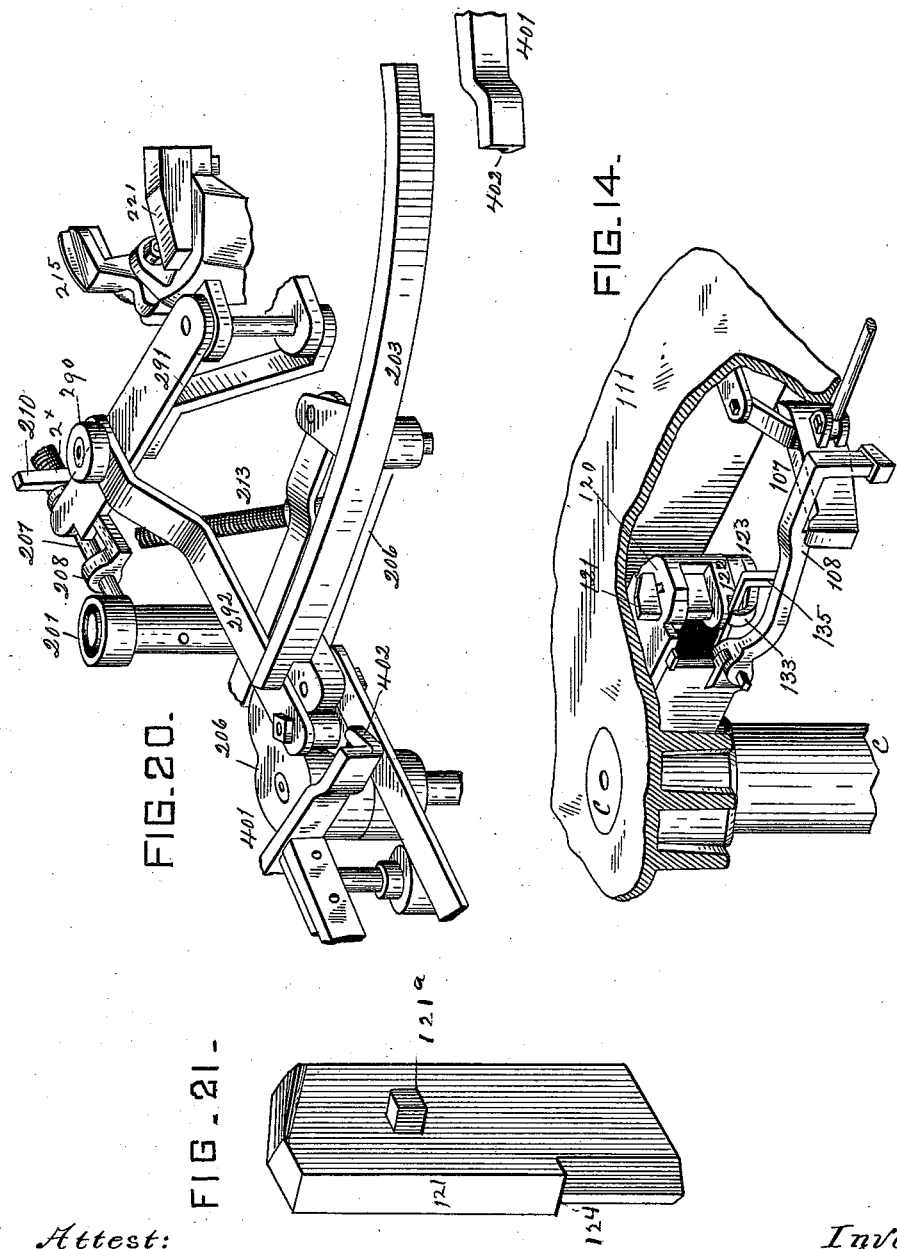

(No Model.) 13 Sheets—Sheet 12.
W. J. PERKINS.
SHINGLE SAWING MACHINE.
No. 561,281. Patented June 2, 1896.
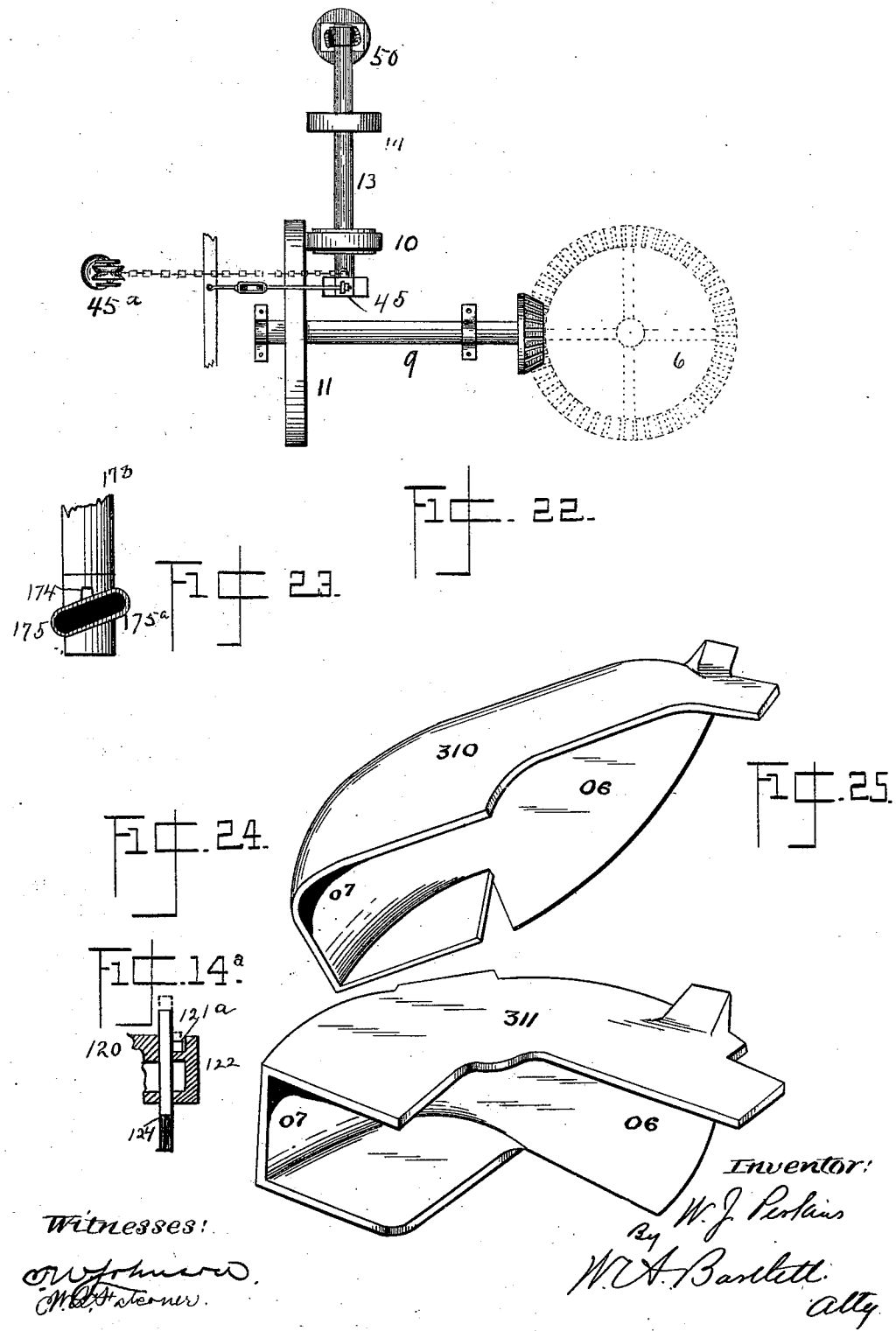
Witnesses:
O. W. Johnson
M. L. Sterner
Inventor:
W. J. Perkins
By W. H. Bartlett
Atty (No Model.)
13 Sheets—Sheet 13.
W. J. PERKINS.
SHINGLE SAWING MACHINE.
No. 561,281. Patented June 2, 1896.
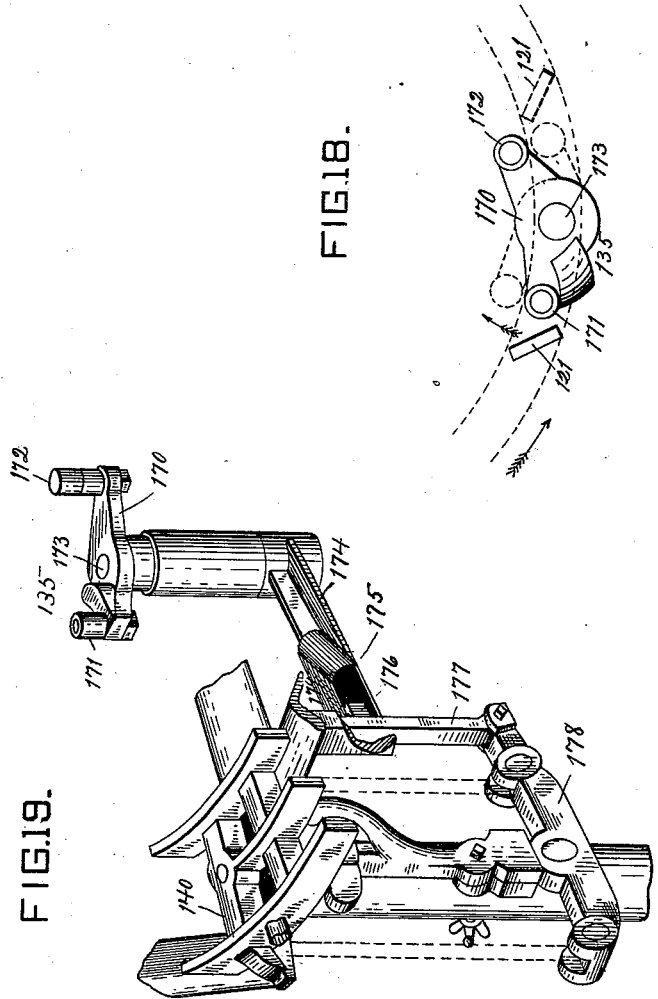
Attest:
J. G. Zepper.
O. W. Johnson
Inventor:
W. J. Perkins
By W. H. Bartlett
Att'y.

UNITED STATES PATENT OFFICE.

WILLIS J. PERKINS, OF GRAND RAPIDS, MICHIGAN.

SHINGLE-SAWING MACHINE.

SPECIFICATION forming part of Letters Patent No. 561,281, dated June 2, 1896.

Application filed November 5, 1890. Serial No. 370,434. (No model.)

*To all whom it may concern:*

Be it known that I, WILLIS J. PERKINS, residing at Grand Rapids, in the county of Kent and State of Michigan, have invented certain new and useful Improvements in Shingle-Sawing Machines, of which the following is a specification, reference being had therein to the accompanying drawings.

This invention relates to shingle-machines of the character in which a plurality of blocks or bolts are continuously moved to a saw or saws and shingles, heading, or box-boards cut from the bottom of the bolts as they pass the saw or saws.

The object of the invention is to improve the construction and operation of this class of shingle-machines; also, to place the entire machine under control of a single operator; also, to make parts of the machine self-operating after the initial impulse shall have been given by the operator, so that no muscular exertion is required beyond the setting of a handle, catch, or lever, leaving the machine to do the remainder of the work; also, to obviate the danger of setting trips, arms, or levers on the moving surface of the carriage-wheel; also, to supply a mechanical bolt-feeder; also, a dogging device automatically adjustable to any ordinary irregularity in the length of the bolts or the angles that the ends of the bolts may be cut on; also, to make the spalt-dropper of such construction that as much time as possible may be allowed for the dropping of the spalt without stopping the machine; also, in providing an automatic device to stop the carriage-wheel; also, in many other details of construction and combinations of parts hereinafter described.

It will be understood that the machine may be changed in many of its details without departing from this invention.

Figure 2:
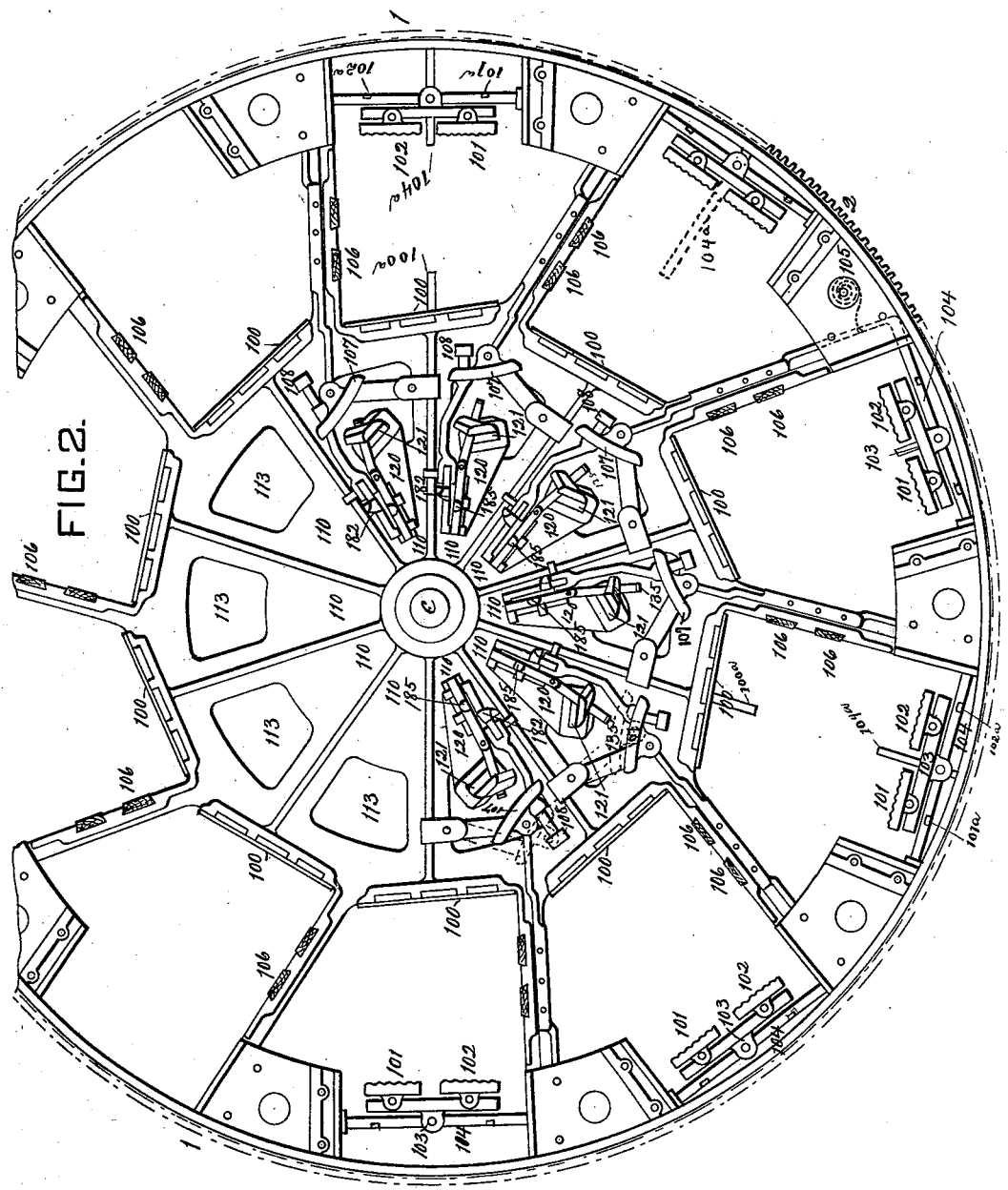
Figure 3:
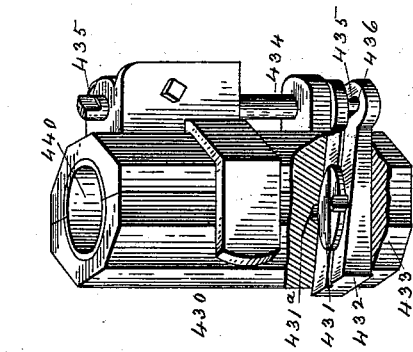
Figure 17:
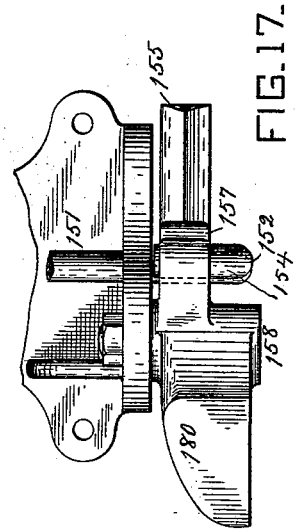
Figure 15:
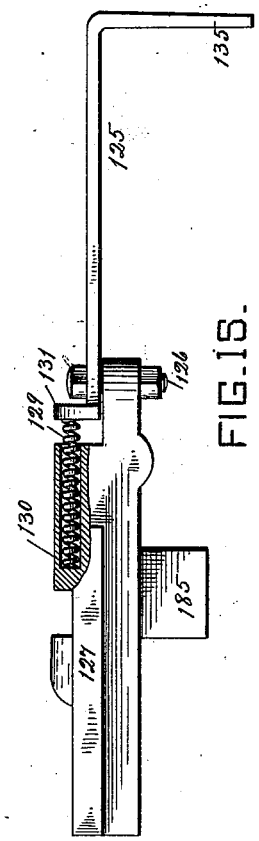
Figure 16:
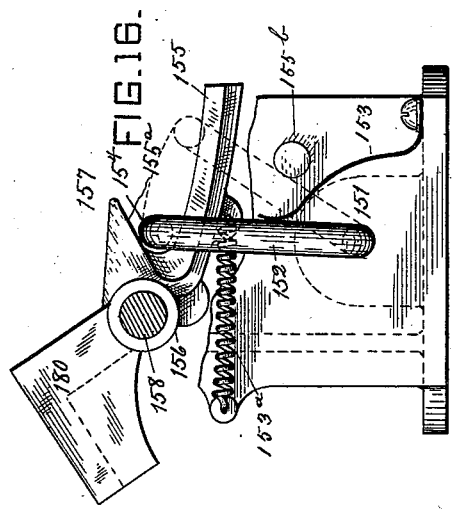
Figure 6:
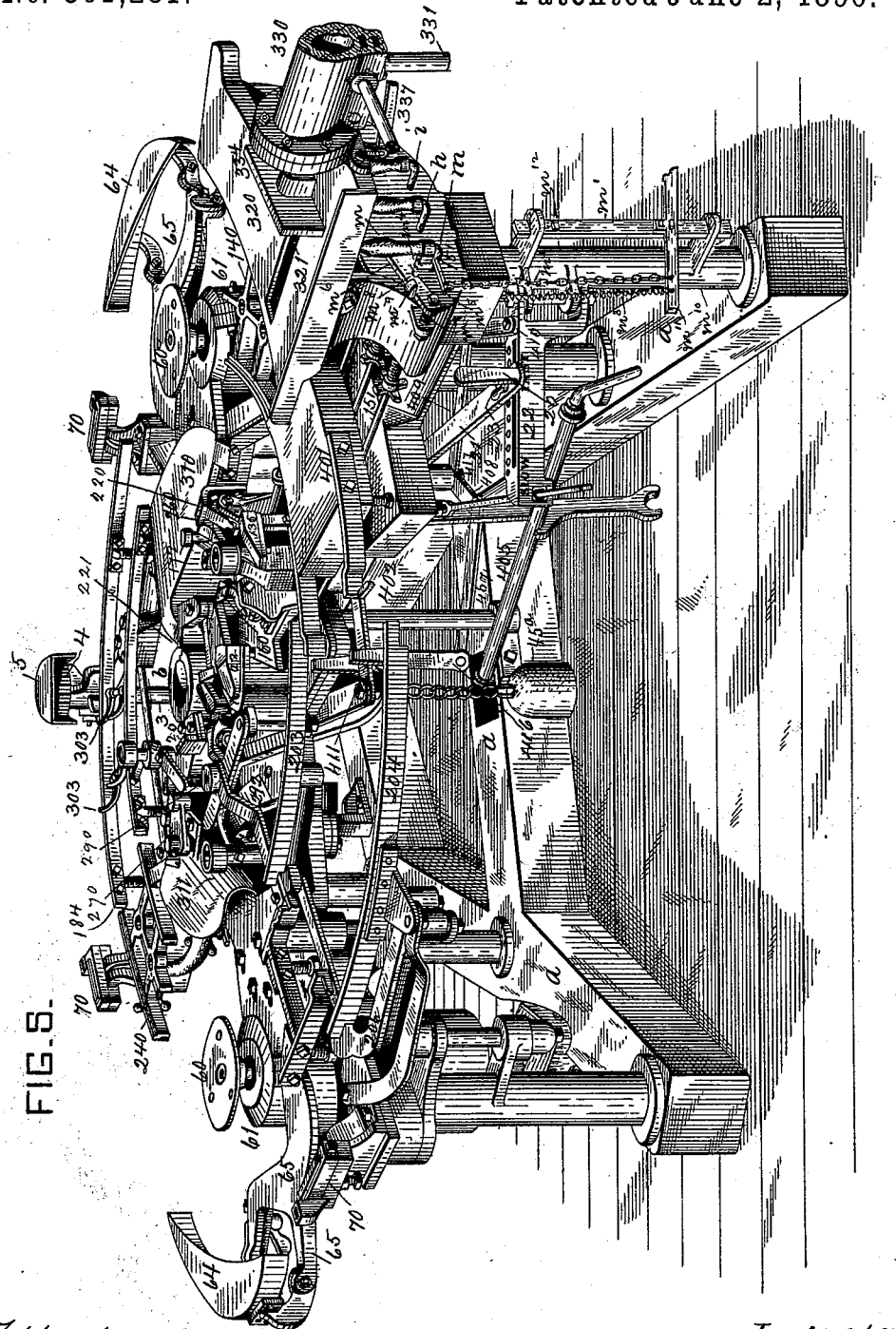
Figure 6:
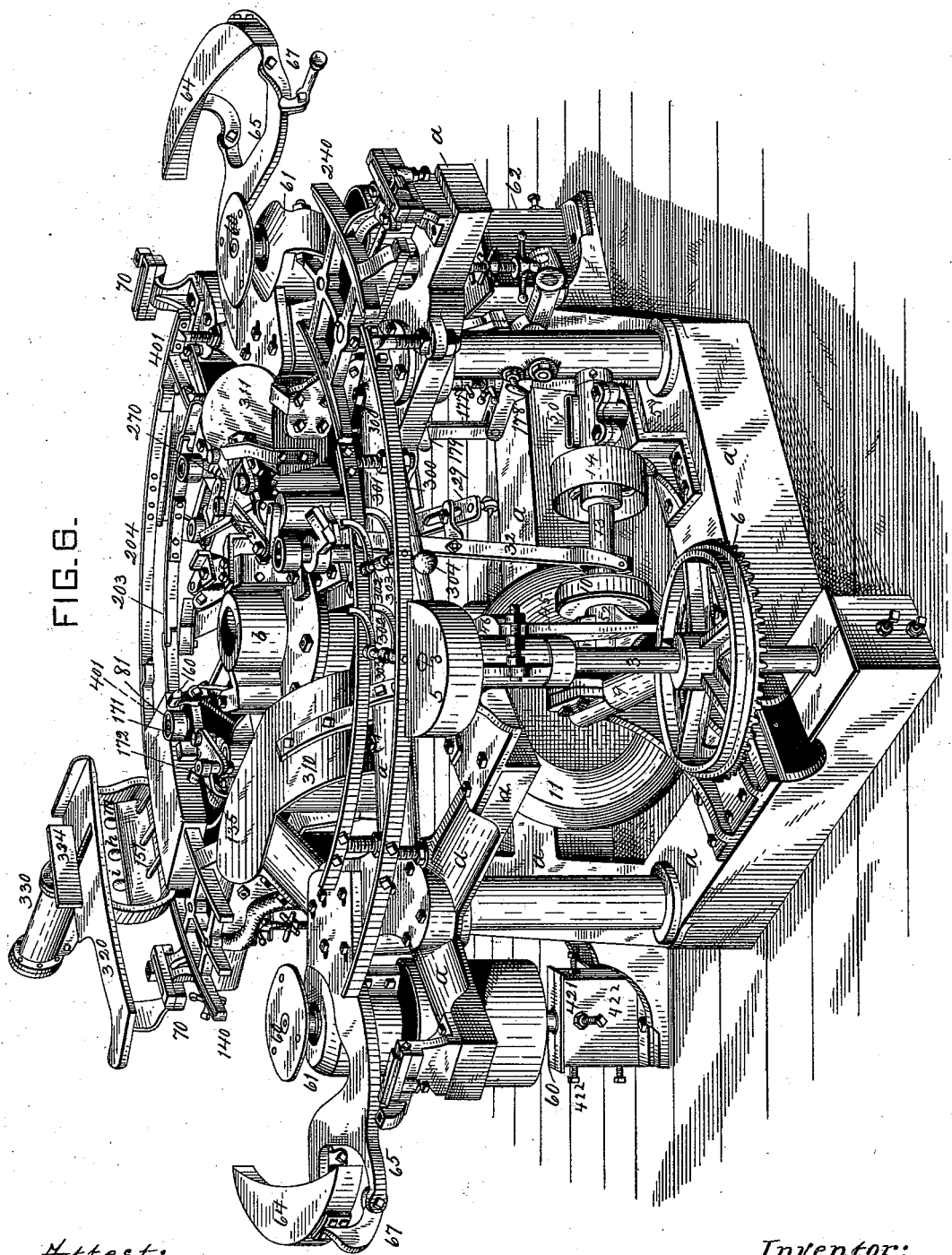
Figure 11:
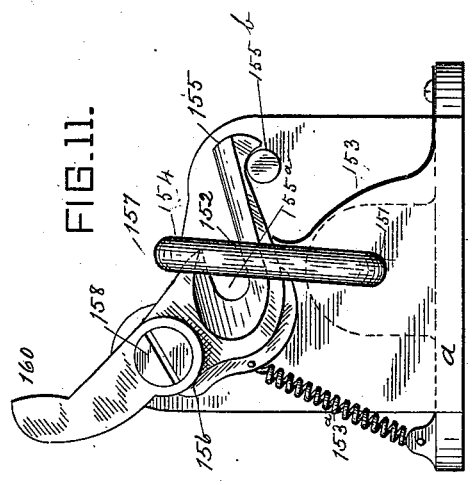
Figure 12:
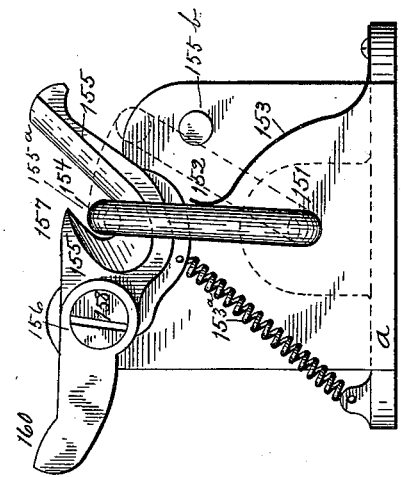
Figure 10:
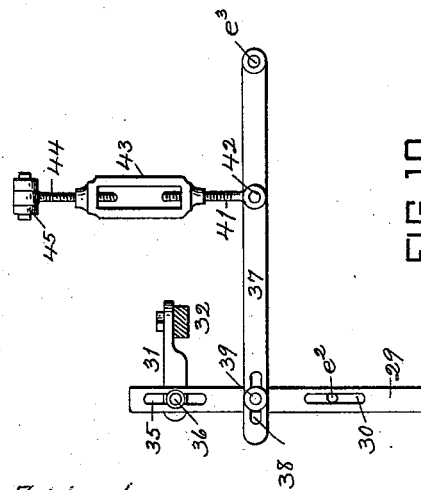

Figure 1 is a perspective view of the machine. Fig. 2 is a plan of the under side of the rotary carriage-wheel or block-carrier, partly broken away and some of the operating parts for a portion of the carrier omitted for convenience of illustration. Fig. 3 is a perspective view of one of the arbor-boxes. Fig. 4 is a plan of the upper deck of the machine, the saws being omitted, the spalter being thrown wide open. Fig. 5 is a perspective from the front or sawyer side of the machine, the rotary carriage or carrier and the saws being omitted. Fig. 6 is a view of the same parts of the machine shown in Fig. 5, but from nearly a reverse direction. Fig. 7 is a view similar to Fig. 4, but showing the spalter and other operating parts in different positions, the spalter being closed. Fig. 8 is a plan, and Fig. 9 a broken detail elevation, of the bolt or block feeding apparatus for supplying bolts or blocks to the machine mechanically. Fig. 10 is a diagrammatic plan of the lever system by which the starting, stopping, and feed of the carriage may be controlled by a single handle. Figs. 11 and 12 are end views of trips operated by the operating-handle. Point of view is taken from the inside. Fig. 13 is a detail in perspective of one form of a fly and connections which actuate the spalter, tilt, or other adjunctive mechanism. Fig. 14 is a broken perspective of the plunger and latch and some of the dog connections on the central part of the carriage. Fig. 14$^a$ is a detail showing in section the support for plunger 121 and the means for stopping said plunger. Fig. 15 is a detail elevation and partial section of one form of the latch, bolt, and spring. Fig. 16 is a detail of one of the trips operated by the handles near the operator; Fig. 17, a plan of same. Fig. 18 is a diagram showing operation of plunger on tilt-head. Fig. 19 is a perspective detail of a portion of tilt connections. Fig. 20 is a detail perspective of spalt-dropper connections. Fig. 21 is a perspective view of plunger 121. Fig. 22 is a detail plan, partly sectioned, of parts of the driving-gear, the parts being shown as a diagram and the rest of the machine omitted. Fig. 23 is a detail end view of the tilt-table arm, showing inclined groove. Figs. 24 and 25 are detached perspective views looking into the lower open side of the sawdust-spouts, 06 representing the upper surface above the plane of the saws and 07 the open mouths of the spouts.

The reference-letter *a* denotes the frame of the machine, which has a suitable base, uprights, and tie beams or bars to support the various operating parts.

The rotary carriage or carrier 1 is supported from a central arbor C, which runs in a suitable box *b* in the frame. The carriage or carrier 1 has an external annular gear 2, which engages a pinion 4 on shaft 3 and is driven thereby.

The outer side of pinion 4 is preferably covered by a shield 5, which is supported on a bracket from the frame or standard. (See Figs. 1, 6, and 7.)

The shaft 3 has a gear 6 firmly secured thereto. This gear 6 is driven by a pinion 8 on counter-shaft 9, which counter-shaft carries the friction face-disk 11. The disk 11 and its counter-shaft are driven by the friction-driver 10, carried by shaft 13. The friction-driver 10 is free to move longitudinally on said shaft, but not to rotate independently thereof, as is common in friction driving-wheels.

The shaft 13 is supported in suitable boxes. Its driving-pulley 14 is driven by a belt from outside the machine. The shifting of friction-wheel 10 along the face of disk 11 will cause a variation in the speed of disk 11 and thus change the speed of the carriages through the mechanism described.

Referring now to Figs. 1, 5, 6, and 10, the numeral 20 indicates the operating-handle by which the speed of the carriage or carrier movement is controlled. This handle 20 is placed in any convenient position, so that it may be readily grasped in the hands of the operator, and is connected to or integral with lever 21, which moves over a guideway 22, and the lever is provided with a stop 23, by which it may be secured in various positions on the guideway, either in the slot 23$^a$ or in any one of the series of holes 23$^b$.

Lever 21 is slotted lengthwise and is pivotally supported from the frame by a bolt or pin $e$, Fig. 10, around which the slot 24 in the lever works rather loosely. Lever 21 is pivoted to a link 26 by a pin 25. The link 26 has a slot 27 extending lengthwise thereof, and this slot works rather loosely around the pin $e'$, which connects the link to the frame. Link 26 is pivotally connected at 28 to lever 29, which has a longitudinal slot 30, and is supported by a pin $e^2$ from the frame, passing rather loosely through said slot. The lever 29 is connected by a link 31 to a pendent lever 32, Figs. 1 and 6, which pendent lever 32 is adapted to slide the friction-wheel 10, through means of suitable engagement with said friction-wheel 10. The lever 29 has a slot 35, and a pin or bolt 36, passing loosely through this slot, permits a longitudinal movement of the lever 29 without moving link 31. A lever 37 has a slot 38, through which a pin 39 passes, said pin being connected to lever 29.

The lever 37 is pivoted to the frame by a pin or support $e^3$. A draw-rod 41 is connected to the lever 37 by a pin 42. This draw-rod is screw-threaded and provided with a turnbuckle 43, which engages a second screw-thread in draw-rod 44, pivoted to the upright lever 45. By turning the buckle the draw-rod may be lengthened or shortened.

The lever 45 is pivoted to a bracket 46 on the frame, and the lower end of lever 45 carries a brake 47, which is thrown into contact with the disk 11 whenever the upper end of said lever 45 is swung far enough away from said disk.

The shaft 13 may have one of its bearings 50 swiveled to a bracket 51 on the frame $a$, so that said bearing may swing on said bracket. The other bearing 52 is preferably in the lever 45.

By swinging lever 45 toward the disk 11 that end of shaft 14 which is supported by said lever 45 is carried toward the disk and the friction-wheel 10 will be engaged with the disk. By swinging back lever 45 the friction-wheel 10 will be disengaged from the face of the disk, and if the lever be swung back far enough the brake 47 will be brought into contact with said disk to stop it, the friction and brake being located on the opposite sides of a fulcrum. By swinging lever or pendant 32 the friction-wheel 10 will be brought nearer to or farther from the center of disk 11, thus controlling the speed at which said disk can be driven. Now by reason of the slots in the levers 21 29 37 and the connecting-link lever 21 may be shifted lengthwise without moving lever 32 at all, and lever 21 may be shifted sidewise, with the effect of moving lever 32 without moving lever 45 at all. Thus the same lever 21 by its different movements serves either to stop or start the carriage-driving mechanism or to regulate the speed thereof, each independently of the other, and by means of catch, pin, or bolt 23 lever 21 may be held in an adjusted position to control the speed of the carriage-wheel. A suitable pressure is exerted on the friction-wheel 10 by means of a weight, as 45$^a$, or a spring-tension may be substituted.

It will be seen from the diagram Fig. 10 that a slight longitudinal movement of lever 21 will be sufficient to stop or start the machine. The sidewise adjustment of said lever controls the speed of the carriage through reasonable limits.

I do not desire to limit my claims to the precise construction of levers and connecting-links described, as any skilled mechanic, with the explanation that I have given before him, will readily be able to make modifications in the structure.

As it is very important that the operator shall not be required to watch too many parts of the machine, this ability to control the entire movement of the carriage by a single lever or handle is very important.

The saw-arbors 60 at opposite sides of the machine are supported in bearing-boxes 61 and 421 at the top and bottom of said arbors, respectively. The relative location of said saws and arbors is much the same as that shown and described in machines heretofore patented to me, excepting that in this machine the center of one of the saw-arbors is located to one side of a line drawn through the center of the opposite saw-arbor and the central shaft c, the object being to prevent the two saws from simultaneously engaging with two shingle-bolts; also, to provide more space for a spalting device.

It will be understood that if both saws are located on one side of the machine there will be more room for a spalting device at the other side; also, that if the saws are not directly opposite each other and the distance of one saw at one side of a line bisecting the machine and the other saw be a different distance than the distance between bolts in the block-carrier then two blocks or bolts of the same size in different or opposite carriers cannot encounter the two saws at the same instant of time.

The saw-guards 64 are supported on brackets 65, extending from the frame, preferably in position to be dropped down away from the saws. A hook 66, engaging the inner end of arm 67, pivoted to bracket 65, holds the saw-guards in position to cover the teeth of the saw where they extend outside the carriage-wheel 1. (See Figs. 1, 5, and 6.)

The antifriction-bearings 70, Figs. 1 and 5, support the outer rim of the carriage-wheel, as is well known in the art.

The carriage-wheel or rotary carrier 1, Fig. 2, is divided into a number of compartments, each of which may receive one or more shingle blocks or bolts, and holds the same when it is carried to the saw. The shingle-bolt is held in its receptacle while passing the saw and while a shingle is being cut from the lower surface of the bolt by holding-dogs, as usual in this class of machines. In the present machine the one end of the shingle-bolt is held against the fixed dogs 100. The other end is preferably held by movable dogs 101 102, which dogs are pivoted to a rocker 103, and the rocker is pivoted to bar 104, which bar is pressed in by spring 105 or other suitable means. The dogs 101 102 are free to rock independently of each other, but may be limited in their movement by suitable engagement with rocker 103 or other suitable means. The rocker 103 has a slight rocking movement on bar 104, and is limited by contact with lugs 101$^a$ and 102$^a$ or other suitable means. Thus the dogs 101 102 will readily adjust themselves to bolts of somewhat unequal length, when it is desirable to dog two bolts in one compartment, or to a bolt having an end sawed at a variation from a right angle to the side.

100$^a$ is a dividing partition or arm projecting outward from the inner end of the carriage. 104$^a$ is a similar dividing-partition projecting inwardly, preferably from the rim of the carriage, but may be located on the bar 104. In sawing two bolts in one carriage there is a strong tendency for the forward bolt to push the rear bolt against the back of the carriage, preventing it from falling readily and causing imperfect shingles. The partitions 100$^a$ and 104$^a$ being short will not interfere with the turning or the handling of the bolts or spalts by the sawyer, and at the same time will prevent totally the two bolts from holding each other up in the dogs or against side of the carriage. By lengthening either of the dividing-partitions 100$^a$ 104$^a$, extending them past the center of the space between the movable and stationary dogs, the other one may be dispensed with. The shingle-bolts are preferably pressed forward toward the saw by blocks or bearing-pieces 106 in the bar or dividing-partition of the carriages at the rear side of said bolt-compartment. (See Figs. 1 and 2.) Each dog is unlocked as the compartment approaches a saw by an abutment or bearing-piece, as 81, on the frame engaging a bearing 107, which is connected to the dogging-rod.

A hook or holder 108 is attached to the carriage-wheel, and an abutment thereon drops down behind the bearing 107 as soon as the same is pushed out by part 81 and holds the dog open after it has moved past the abutment 81 and until the tilting, spalting, or other operation is performed, when the hook or holder 108 is lifted by passing against an abutment and the dog again comes under control of its spring. A substantially equivalent dog-holding mechanism is described and claimed in my application, Serial No. 338,340, filed January 28, 1889.

The rotary carriage 1 carries a series of flies, trips, plungers, or actuating-pieces, which are actuated or thrown into operative position by handles, treadles, catches, or levers, preferably outside the machine and near the operator's table. These flies or trips, when thrown into operative position, serve to actuate the tilt-tables (one tilt-table being at each side of the machine) or the spalt-dropper or any other function requisite in machines of this class.

The operator by moving one handle, treadle, catch, or lever sets the mechanism so that it afterward, as hereinafter described, operates automatically to drop the spalt, and the handle, treadle, catch, or lever is reset by the action of the machine. The same is true of the mechanism for the tilt-table.

As in other machines of this class, the blocks when undogged are dropped on ways or tracks which lead, respectively, to the tilt-tables and after being tilted to proper position are seized by the dog and carried forward. The blocks may be loose while riding on the curved way, and some part of one of the curved ways is movable, so that the block may be dropped out while riding on this way.

For each shingle-bolt compartment in the carriage or carrier there may be a corresponding compartment 110 near the central shaft. The apartment 110 contains the dog-actuating mechanism 107 108 and a fly, trip, or pusher which, by its various positions, serves to actuate the tilt-table train, spalter, or other adjunctive mechanism.

The dome 111 has openings 112, preferably covered, as by plates 113, which permit access to the flies and catches under the dome for oiling and other purposes, but which exclude dirt and sawdust when closed.

The dogs are thrown open as the bolt-carriers approach the boltways by abutments 81 on the frame, Figs. 4, 5, and 6, which is claimed in my application, Serial No. 338,340, filed January 28, 1890, and is not herein claimed. The broad idea of detaching the dogs by some of the moving dogging mechanism engaging a fixed abutment is old and well known.

The fly 120 in each compartment 110, Figs. 2, 13, 14, 15, and 18, has a plunger or actuator 121, which serves to actuate either tilt-table or the spalt-dropper for its bolt-compartment or other adjunctive mechanism, or the same may actuate all these parts successively, the plunger being mechanically returned to inoperative position immediately after actuating one of the auxiliary parts of the machine unless set to act otherwise.

The plunger 121 preferably moves vertically in a suitable bearing in the support 122, Fig. 13. The face of the plunger may be set obliquely to the circle in which the plunger travels, so that when it encounters a part which it is to actuate plunger 121 will present an inclined face thereto and act to push the same sidewise—that is, radially of the machine, or nearly so—or the actuating-face of the plunger may be set in any suitable manner and the actuated part be properly constructed to be operated by it.

The plunger 121 moves in a slideway in the support 122 on fly 120. This support 122 has a brace 123 extending down alongside the plunger. The side of plunger 121 has a suitable notch or abutting surface 124, in which the spring-pressed latch or catch 125 engages when the plunger is raised.

I do not desire to limit my claims to the precise construction of holding-latch and connecting parts as shown nor to the longitudinal or pivotal motion described, as any skilled mechanic with the explanation that I have given before him will readily be able to make modifications in the structure and movements of same.

The latch 125 is preferably loosely attached by pivot 126 to sliding bolt 127, Figs. 13 and 15. The bolt 127 may be supported in slideways 128 on the fly. A suitable spring, as 129, is preferably used to force latch 125 toward plunger 121. It also serves to hold latch 125 in adjusted position. One form of spring 129 is shown as held in a socket 130 in the bolt 127. Said spring may bear on a projection, as 131, at one side of the latch 125, tending to press the latch to one side and swing it into the notch of plunger 121. The bolt 127 may slide in its supports 128, its movement being nearly radial to the carriage. Latch 125 moves with the bolt; but spring 129 will press the latch toward the abutting surface in plunger 121 regardless of the position of the latch. Latch 125 may rest on a guiding-shelf 132, Figs. 13 and 14, which projects from brace 123. The shelf 132 has a lug or stop 133 at its end and is inclined upward, so that when the downturned end 135 of latch 125 is struck the latch will turn on its pivot and first moving out of the notch in plunger 121 permit said plunger to fall. The latch may ride up the incline of shelf 132 or its pivotal axis may guide it upwardly, or there may be a sufficiency of lost motion permitting lifting the end 135 so that it may pass over the trip or obstruction, or on its engagement with any suitable stop, as lug 133, the extra pressure exerted by said stop will force said obstruction out of the way of latch 125. Latch 125 thus controls the falling of plunger 121. The lifting of said plunger is done by inclines 735 and 221. The plunger 121 has a suitable stop, as 121$^a$, which engages with a properly-located abutment and limits the downward movement of the plunger. The latch 125 preferably has movement in a plurality of directions—such as a swinging movement on a pivot, as 126, and a longitudinal movement on a bolt, as 127.

Handles $h$ and $i$, Figs. 5 and 7, near the operator's table, control the trips on the frame, which serve as obstructions to move the latch 125, and thus unlock any one of the plungers 121 at a predetermined time.

In the place of the handles $h$, $i$, and $m$ may be substituted any form of device for controlling the parts connected therewith. Handle $h$ governs one tilt-table and handle $i$ the other tilt-table.

The operation of the two mechanisms is alike and a description of one applies to both. The desirability of both will be understood from the following explanation.

If all blocks were straight-grained and the saws worked uniformly, one table might be set to incline in one direction and the other in opposite direction, and the result would be that one saw would cut the thick or butt end of the shingle from the outer end of the bolt and the next saw would cut the point from the outer end of the bolt, and the work would progress uniformly and nicely and the upper and lower sides of the shingle-bolt would always remain parallel with each other. In practice it is frequently necessary to cut two, three, or more shingle-butts successively from one end of the bolt to get an approximately straight-grained shingle, or to throw a knot or other defect into the point of the shingle, or to straighten the block up, so that the upper and lower sides may be parallel, and this may apply to only one or two of the ten or more bolts in the carriage; and, again, the bolt immediately following the one to be grained may also require that the tilt-table be in its abnormal position or be shifted normally. The position of tilt-table that is necessary to best work up the shingle-bolt is a matter of judgment determined wholly by the sawyer in charge of the machine.

Referring to Figs. 4, 5, and 7, where the mechanism about to be described is shown generically, and to Figs. 11, 12, 16, and 17, for details, it will be understood that handle $h$ is adapted to control tilt-table 140 and handle $i$ is adapted to control tilt-table 240 substantially in the manner hereinafter described.

If the operator sees a block or bolt approaching which requires that the shingle be cut abnormally, he simply shifts handle $h$ to the left, when some index or portion of the carriage shall be at or near a predetermined position. In practice I prefer the dividing-arm between the carriages as the index or gage for operator to determine relation of the handles and adjunctive mechanism by, but any other suitable index may be employed and the best time to shift the handles for tilting, when the dividing-arm is within a reasonable latitude of operator's right hand; the carriage operated upon being the one following the dividing-arm. The spalting is determined and controlled in a similar manner, but when the dividing-arm is approaching the operator's left side.

The handle $h$ is automatically restored to normal position substantially as hereinafter described and preferably by a spring, as 153, (see Figs. 11, 12, and 16,) the operator giving it no further attention, as the machine then cuts this one shingle abnormally, and then restores all parts to their normal position. If it be desired to cut two shingles abnormally from one block, he sets both handles $h$ and $i$ at proper time to effect the movement of plunger 121 in the desired compartment. The plunger 121 when dropped to actuate table 140 is quickly lifted by incline or abutment 735, and may again be dropped by the mechanism which handle $i$ operates to act on table 240, when the carriage in its travel has reached the operating-train for said tilt-table, and is restored to normal position in the same manner by second incline or abutment 735. Handle $h$ is connected to a rod 151, suitably supported in the frame. This rod 151 serves to transmit a rotary movement, and may be slightly flexible for convenience in arrangement. The inner end or rod 151 is preferably turned up into a hook or loop 152, Figs. 11, 12, 16, and 17, and suitable means, preferably a spring, as 153, Fig. 12, or in other suitable position, tends to return to and hold the loop or hook and the operating mechanism connected thereto in normal position.

Spring 153 forces the upper end or bar 154 of the loop 152 into notch 155$^a$ at base of arm 155 on pivoted trip-lever 156. Lever 156 has a bearing-surface 157 near its pivot 158, against which bar 154 engages.

When handle $h$ is shifted by the operator, loop or hook 152 will be carried outward along arm 155, releasing lever 156. A spring 153$^a$, acting on lever 156, instantly forces it from the position shown in Fig. 12 to the position Fig. 11. The operator releasing handle $h$, bar 154 of loop or hook 152 is forced by spring 153 against bearing and locking surface 157, holding lever 156 in position shown in Fig. 11. Lever-arm 155 rests against a stop 155$^b$, limiting the movement or elevation of stop, trip, or arm 160. Stop 155$^b$ may also serve to limit the rotation of rod 151. Position shown in Fig. 11 shows stop, trip, or arm 160 of lever 156 extending upward in position to act as a trip. Stop, trip, or arm 160, when thus thrown up, is in the path of movement of latch 125 or the arm 135 thereof. The trip 160 is held up by the bearing and locking surface 157 and the bar 154, forming a yielding lock. When the arm 135 encounters said trip, arm 135 will be held until the plunger 121 is released. Said arm then engages with a suitable lug or stop, as 133, Fig. 14, and forces trip 160 down and bar 154 to the right off from bearing-surface 157. Bar 154 then engages with bearing and locking surface on the arm 156 as the notch 155$^a$ and retains lever 156 in the position Fig. 12. It will thus be seen that the shifting of handle $h$ allows trip 160 to assume a proper position to release the plunger 121 by engaging latch 125, but that latch 125 after it is operated on by trip 160 to release said plunger rides over the trip 160, and then it is restored to normal position by spring 129.

Bearing-surface of notch 155$^a$ on arm 156, as the notch is at an angle or incline to a radius drawn from center of pivot 158. The bar 154 rides up said incline, being forced forward by spring 153, and partially turns lever 156, so as to lower end 160 below the plane of travel of arm 135, preventing thereby the constant friction or engagement that would otherwise exist between the end of arm 135 and trip 160. The spring 153$^a$ may be of sufficient tension to hold trip 160 into operating adjustment without the assistance of the locking-surface 157 and bar 154.

Referring now to diagram Fig. 18, the plunger 121 is indicated in full lines as about to approach a tilt-operating head or lever 170. Lever 170 has two arms 171 and 172, each preferably provided with antifriction-rolls or other antifriction devices, Fig. 19. The lever is secured to a rock-shaft 173. As the plunger when in released or lowered position approaches the abutment or antifriction-piece on arm 171 the inclined position of the plunger causes it to press the arm 171 to one side, in this case toward the center of the machine, as shown in dotted lines, Fig. 18. This swinging of lever 107 rocks shaft 173 and swings arm 174, secured to said shaft. Arm 174 has a cam-groove 175 in its outer end, which cam-groove has upper and lower bearing-faces and receives the pin or lug 176, attached to a link 177, which link may be attached in any suitable manner to tilt-tables of ordinary construction for this class of machines. The link 177 serves to bring the connection between the tilt head or lever 173 well up out of the way of sawdust. The upper end of link 177 may be guided in socket 179, attached to the frame, or in any convenient manner.

The cam-groove 175 may be closed at its ends against the reception of sawdust by a suitable plate or shield 175ª.

Arm or antifriction-roll 172 projects upward above the level of arm 171 and into the path of movement of plunger 121, whether the same be up or down, while arm 171 is below the plane of travel of plunger 121 when said plunger is held up by latch 125. When the plunger bears arm 171 to one side, the arm 172 is swung into path of movement of said plunger.

Incline 735 lifts plunger 121 as soon as it has passed arm 171, and the plunger is caught and held up by swing-latch 125; but in its further movement the plunger engages arm 172 and again swings the tilt-head 170, restoring the same and the tilt-table (by means of the connections described) to normal position for the following carriage.

The handle $i$ operates trip 260 in precisely the same manner described for the mechanism connected to handle $h$, and the connections are similar. If plunger 121 be dropped by the operation of trip 260, it will stay down until the carriage has moved around to the second tilt-head, when it will actuate that head 270 in the same manner as has been described.

For the purpose of setting the mechanism to operate the tilt 240 at the same period of rotation and using the same indices for operator's guidance as were used for setting corresponding parts for tilt 140 it was preferable to place the second tilt-lever 270 in advance of the rock-shaft 273, connecting same to it by link 271, suitably pivoted to each. The shaft 273 will thus move synchronously with the tilt-head, and arm 274 will operate the second tilt-table 240 in manner described for the first tilt-table and by mechanism the duplicate of that shown in Fig. 18 for operating the first tilt-table.

The trip 180 may be operated by handle $m$, Fig. 5, in the same manner as has been described for the trips connected to handles $h$ and $i$. The trip 180, when adjusted for operating position, preferably extends into the travel of the path of movement of a lug or trip 185, suitably supported, as on the latch 125 or connected parts, Fig. 13, and by reason of the inclined or tangential arrangement of the trip 180 the said trip moves latch 125 or connected parts lengthwise.

A projection 182, preferably on the fly 120, engages the trip 180 after the latch 125 or its connected parts have been moved and turns down said trip to normal position, where it is caught and locked by bar 154, as heretofore described about the tilting-trip. When latch 125 and connected parts are moved inward, as described, the end 135 will on the further travel of the carriage engage an abutment 184, Fig. 7, suitably supported, which abutment will turn back the latch 125, releasing plunger 121 and allowing it to fall. When latch 125 is turned back, it will ride by the abutment 184.

The plunger 121 being dropped, as described, after it has passed the second tilt-head 270 will engage the roll 290 on bar or lever 291 and operate spalting device by means of link 292 spreading the spalting-ways into position shown in Fig. 4.

The link 292 is connected to a lever 206, which lever is suitably pivoted to the frame and supports one of the ways 203, which way is pivotally supported on the free end of said lever. A link 616 connects one part of said way with the frame, so that the way maintains a direction nearly parallel with its fixed position while opening. The opposite way is supported on a corresponding lever 205, and the levers 205 206 are connected from opposite sides of their pivots by a link 617, so that the ways 203 204 move toward or away from each other and maintain their parallelism. As this happens when the dogs are thrown open, (as described in my application Serial No. 338,340, filed January 28, 1890,) the spalt will be dropped between the movable ways 203 204, as described in said application.

The inward movement of latch 125 does not carry it out of position to engage the trips 160. The handles $m\ h\ i$ may be moved as desired, and the effect of either one on the shingle-bolts borne in the approaching carriage will be the same as if no other handle were operated.

The movable spaltways are supported on arms 205 206, as in the application referred to, and link 292 connects to one of said arms.

A rock-shaft 207 is suitably mounted and has an arm or catch 208 in position to engage the end of bar 291 when turned up to make this engagement, Fig. 4, but lying under said bar when the spalting-way is closed. An arm 210 on the rock-shaft 207 is in the path of movement of lug 185 when the latch 125 is slid outward, Fig. 20. Rock-shaft 207 may be moved by a suitable spring, as $2^\times$, to throw up the arm or stop 208 when arm 291 permits it to rise. Now if spalting-ways 203 204 be thrown apart the stop 208 will rock up in front of arm 291 and hold the spalting-ways open until one of the lugs 185, which has not been pressed inward, strikes the arm 210, when the rock-shaft will be turned, the stop 208 disengaged, and the spaltways closed by the action of suitable pressure, preferably a spring, as 213.

An incline 215 returns all latches to normal position. An abutting surface 221 lifts all plungers 121 which are not already lifted. Thus the operator may shift handle $m$ and hold it either by his hand, foot, or by means of a latch $m^6$, Fig. 5, until all the carriage-compartments have passed, and without moving either tilt all the blocks or spalts will be dropped out successively at the proper time, while all operating parts will be automatically restored to normal position to carry new blocks without further attention from the operator. Adjusting latch $m^6$ to lock arm $m$ into operating position leaves operator at liberty to remove his spalts or bolts as they drop through the spalting-ways, thereby preventing an accumulation that might partially hold up subsequent blocks and damage the machine.

In Fig. 5, $m^6$ is the spalt locking-latch. Depressing same locks rod 151 into shifted position by engagement with lug $m^4$ on said rod. $M^7$ is a spring to return latch to normal position. $m^9$ is a stop to limit throw of latch. $m^8$ is locking-notch in latch $m^6$.

By the construction described the spalting-way may be opened as quickly as possible and not drop out the preceding block, and the spalting-way may be closed only as the block approaches, which should not be dropped, and by mechanism connected with that block-compartment, the object being to obtain all the time practicable in which the block may drop from the moving parts of the machine through the stationary parts in its descent out of the carriage.

If a number of spalts are to be dropped in succession, the way is opened but once and remains open until closed by action of the proper mechanism.

It is desirable to have the spalting-trip arranged so that it may readily be set by the operator. In this case I have provided for using either hand or foot.

Objects of the plurality of adjustments are as follows, viz: The operator may wish to block one carriage and set spalting-trip for following carriage. Both hands are used in placing bolt. His foot is the most convenient means to operate the spalting-trip with. His block may be riding on the dog. He may wish to turn his bolt or he may be operating his graining or tilting trips, all requiring the active use of his hands and allowing the freedom of his feet.

When it is remembered that many thousand spalts per day will be dropped out of the machine, it is apparent that a plurality of means for operating the spalting device is certainly beneficial.

The following parts are preferably arranged substantially as described.

In Fig. 5, $m^5$ is an arm or lug preferably integral with trip-operating rod 151; $m^2$, a chain or flexible connection between lug $m^5$ and a treadle or foot-lever arrangement $m'$. $m'$ has vertical motion in sliding bearings on post $m^{10}$. $m^{11}$ is a cross-bar attached to it. A tension-spring $m^3$ pulls it upward. $m^3$ is attached at opposite ends to lever $m^{11}$ and the post $m^{10}$. $m^{12}$ is an abutment on vertical arm $m'$ of treadle to limit its movement upward. Suitable stop at base limits its descent. Pressure on cross-bar $m^{11}$ through chain $m^2$ partially rotates trip-rod 151 precisely the same as shifting-handle $m$. Connection $m^2$ being flexible allows handle $m$ to be turned without effecting treadle arrangement.

The blocks or bolts are liable to assume an angular or askew position in the compartments, notwithstanding they may be started squarely. To remedy this, I apply between the fixed tracks 300 301 (on which the blocks ride when undogged) hooks, fingers, block-straighteners, or pulleys 303 303, fixed to shafts 302, which shafts preferably extend from track to track. The location of these abutments is immaterial.

A tension device, preferably a weight, as 304, may be suspended from shaft 302, and tends to throw the hooks, abutments, or abutting surfaces into contact with the blocks, but permits the hooks or abutting surfaces to swing away from the blocks. The arms will thus bear with a frictional pressure against the blocks and work them back against the pressers 106, so they may be grasped squarely by the dogs.

The saws both run in direction to press the bolts toward the inner dog. Hence the sawdust as it leaves the saw is thrown with great force toward the center of the machine. The sawdust-spout 310 is a trough closed at its inner side (see Fig. 5) and open at its outer end, Fig. 6, preferably for a distance great enough to receive a segment of the saw. The spout then leads inwardly and down toward the bottom of the frame. The spout 311 is a curved trough open at its outer edge and leading inward and downward toward the center of the machine. Heretofore great trouble has been experienced by the lodgment of the sawdust and debris in the spouts, the same finding a resting-place upon the lower side of the sawdust-spout. Shingle-sawdust is thrown out of the machine in wads, each wad substantially representing the kerf requisite to sever the shingle from the shingle-bolt. A piece of a knot, or a sliver, or any one of these wads first lodging in the spout forms a nucleus around which the subsequent wads or debris from the machine very quickly accumulate and obstructs and clogs the free passage of the sawdust through the spout. In the present device it will be noticed that the sawdust-spouts on both sides of the machine are quite short; also that the flight or course of the sawdust from the left-hand saw is not deflected in the opposite direction, as in my former patent, No. 380,346. On the contrary, the tangential movement of the sawdust is adhered to and it is simply turned downward, being deposited at the base of the machine. No bottom side is used. Therefore there is no surface on which the sawdust can find lodgment, and consequently there can be no stoppage of the spout.

The mechanical blocking device, Figs. 5, 8, and 9, (and shown in other figures,) is applied at the operator's table 320. The table preferably has a slot 321, in which the levers hereinafter referred to may move.

The carriage-wheel 1 has suitable trips, as 821, in convenient locations near the rim of the wheel.

The trips shown are similar to those described in my Patent No. 380,346, dated April 3, 1888; but it is apparent that other suitable trips or means might be used, as the plunger 121.

The trips when thrown into radial position are held by bosses 322 on the wheel and serve as actuators for mechanism outside the wheel. An abutment 323 serves to lift the trips after they have passed the table and throw them back into inoperative position, as in the patent referred to.

A cylinder 330, which receives any suitable fluid through pipe 331, is applied near the table 320. This cylinder has a piston 332 and a rod 333, provided with a block-pusher 334. The bell-crank lever 335 extends into the path of movement of trip 821 when said trip is in radial or extended position. End of lever 335 is preferably angular to better allow action of trip 821 on it. When thus engaging, the lever is rocked and the arm 336 draws on the rod 337, actuating the valve-lever 338 and opening a suitable valve to admit steam or other motive agent to one end of cylinder 330. The piston is moved, and as the pusher or head 334 reaches arm 335 said arm is pushed down and valve 338 shut off. A further movement of head 334 causes it to engage arm 340, thus operating the lever 341, which is an extension of arm 340, and by means of rod 342 opening valve 343, which permits the escape of steam from the cylinder at one side and admission at the other end of the piston, thus reversing the stroke and carrying piston back. On the backward movement of pusher 334 it rides on arm 346, which arm is connected to arm 340, permitting the cylinder to exhaust itself in the ordinary manner.

It will be understood that the construction may be changed within reasonable limits. The exact location of the cylinder is not important, as the form of construction may readily be varied by a skilled mechanic.

The tracks or block-supports 400, Fig. 4, are supported from the frame in any convenient way. The tracks 401 are fixed continuations of the spalt-dropper and may have supporting-shelves 402, on which the movable sections 203 and 204 rest when the spalter is closed. This mechanism is claimed in my application, Serial No. 338,340, filed January 28, 1890. The fixed tracks or ways 400 and 401 are on the opposite side of the machine from the fixed ways 300, hereinbefore referred to. Lever 405 is not claimed in this application, but is shown in my Patent No. 380,346.

The saw-arbors 60 are driven by pulleys 420 and are supported in bridge-pots 421, in which the arbors are adjustable to aline the saws. The arbors 60 are supported in the upper bearing-boxes 61, in which they may have a slight movement in any direction by means of a suitably-adjustable bearing-box, as described in my Patent No. 387,441, dated August 7, 1888. The lower part of the shaft runs in a bridge-pot 421, which may contain oil or other lubricating fluid.

The bridge-pot 421 contains a bearing-box 430, Fig. 3, in which shaft 60 runs. Box 430 may be moved in the bridge-pot by screws 422, which bear against it. The shaft rests on a step 431, which in turn rests on a wedge 432, and the wedge rests upon the bottom 433 of the box. The wedge may be drawn along by turning the key-shaft 434, which shaft has an eccentric-pin 435, which enters a slot in the wedge. By turning key-shaft 434 the wedge may be moved and step 431 be raised or lowered, thus raising or lowering the saw-arbor. Slots in box 430, into which fit lugs in step 431, prevent it from shifting with travel of wedge 432.

A wrench may be applied to the squared head 435 of the key-shaft to turn the same.

The plunger or actuator 121 (described as in each compartment under the dome of the carriage) may of course be otherwise located, so that it moves synchronously with the carriage and maintains its relation with the bolt-carrier. This actuator will operate to throw the tilt to abnormal position only when itself is in abnormal position, but will restore a tilt to normal position (if it be out of said position) whatever the position of the actuator may be.

When one actuator opens the spalting-way, said spaltway is held open by its catch without regard to the position of the succeeding actuator; but the first carrier or carriage compartment which has its trip or lug 185 in normal position acts to release the catch which holds the spaltway open, and the way immediately closes. This places the spalter well under the control of the operator, who may drop any number of shingle bolts or spalts successively; but if he leaves any trip 185 in normal position that trip will release the catch, the spaltway will close, and that particular bolt will remain in the carriage.

It is a much smaller strain on the machine to fasten the spaltway open and permit the blocks to fall out than to open the spaltway a number of times and permit the same to close in rapid succession.

The tilt-head having an arm in position to be engaged by the actuator whenever the tilt is in abnormal position, whatever be the position of the actuator, is considered a valuable feature of the invention.

The carriages may have any number of bolt compartments or carriers; but ten compartments or carriers is about the usual number.

In case of an accumulation of spalts under the spalting-way holding a block up, so that it catches between back of carriage and ways 401, or on account of the block catching in the carriage in the act of spalting and being forced against said way 401, also for many other reasons, an automatic device for stopping the carriage-wheel is desirable. A rock-shaft 406, Figs. 4, 5, and 7, is supported on parts of the machine-frame in suitable bearings. Arms 411 project from said rock-shaft. 416 is a corresponding arm of reverse projection. A link 407 connects arm 416 with one arm 418 of bell-crank 417.

Bell-crank 417 is suitably pivoted to machine-frame *a* or parts preferably attached thereto. Link 410 connects the second arm 409 of bell-crank 417 to the guide way or support 22, to which is fastened the operating-handle 20, as heretofore described.

In case of accident similar to that heretofore mentioned the arms 411 are moved by the carriage and obstructing-block and, through means of link and bell-crank shown, actuate the operating-handle to stop the carriage-wheel.

The automatic stopping device may of course be changed in very many of its details. Thus in some constructions a projection or projections from lever 21 or working with a single intermediate may be shifted by a spalt in abnormal position, so as to stop the machine. The arm and connected train of levers is a common form of devices for conveying power, and I claim the same specifically only so far as the modifications I have invented make the same applicable to this particular machine. I claim generically, however, such connections or their equivalents whereby the machine is automatically stopped to avoid accidents.

In the foregoing specification I have described one operative form for applying the principle of my invention; but changes, substitutions, and omissions may be made as to the described parts provided only the essential elements of the invention set forth in the following claims are employed.

In my application, Serial No. 338,340, hereinbefore referred to, I describe and claim an arm near the periphery of the machine which has a number of movable parts, and the movement of said parts, caused by the engagement of the handles therewith, adjusts the arm to different positions to operate on or actuate different adjunctive parts of the machine. In the present application the actuator, which has a function similar to said arm, is placed in a compartment and within the rim of the machine—that is, between the block-carriers and the central shaft. The actuator is different in construction and is in closer relation to the machine adjuncts than in the application referred to. Other distinctions are intended to be pointed out in the claims in the respective applications.

What I claim is—

1. The guideway 22, the slotted lever 21 having a fixed pivot in its slot, and movable laterally and longitudinally on the guideway, the slotted link 26 pivoted to the lever 21 and having a fixed pivot in its slot, the slotted lever 29 pivoted to link 26 and having a fixed pivot in its slot, said lever 29 having direct connections to the friction-gear to shift the same by a side movement substantially as described, lever 29 having connections to the driving-gear to throw the same into or out of operation by its end movement, the parts in combination substantially as described.

2. In a shingle-sawing machine, a saw and driving mechanism therefor, and a carriage continuously moving in one direction and driven by a shaft which receives its driving-power from a driver independent of the saw-arbor a friction-driver movably mounted on said shaft, and a counter-shaft and driving-gears connected to the carriage, said counter-shaft having a wheel which may be engaged by the friction-driver at different distances from its center, all in combination substantially as described.

3. The slotted lever 20, the slotted link 26, having a fixed pivot in its slot and the slotted bar 29 pivoted as described, and connected to the friction driving-wheel, the slotted lever 37 connected as described to the lever 29 and to the shaft of the friction-wheel, and the friction-disk and its gear connected to the rotary carriage, all combined substantially as described.

4. In a shingle-machine of the character described the lever 21 and its adjuncts connected to the friction-wheel to shift the same by a movement of said lever, and the connections to the friction-wheel shaft by which the same is shifted by a different movement of the lever, the connections to the carriage as described, the guideway 22, and means for holding lever 21 in any of its adjusted positions in either direction upon the guideway, substantially as described.

5. The guideway 22, the slotted lever 21 pivoted as described, the compound lever system composed of links 26, 29, and 37, the extensible connecting parts connected to lever 37, the shaft-support connected to said lever, and the friction-gear controlling the carriage movement, all combined and relatively arranged substantially as described.

6. The combination with the carriage and a fixed dog thereon, of a movable bar opposite the fixed dog, and a plurality of dogs pivoted to the movable bar, so as to be self-adjusting with respect to the shingle-bolts, substantially as described.

7. The dog-support 104, the bar 103 pivoted thereto, and a plurality of dogs pivoted to said bar 103, in combination with the carriage of a shingle-machine, substantially as described.

8. In combination with a shingle-bolt carrier having a fixed dog, a plurality of movable dogs at the other end of said carrier, said dogs being supported on a swinging piece, and stops to limit the range of movement of said dogs in their automatic adjustment to the form of the block or blocks, substantially as described.

9. In combination with a shingle-bolt carrier having a fixed dog, a plurality of movable dogs at the other end of said carrier, said dogs being supported on a swinging piece so as to adjust themselves to different blocks, substantially as described.

10. In combination with a bolt-carrier having a fixed dog, a spring-pressed bar at the opposite end of the carrier an equalizing-bar pivoted to said spring-pressed bar, and a plurality of dogs pivoted to said equalizing-bar.

11. The combination of a bolt-carrier, a set of fixed dogs at one end thereof, and a plurality of self-adjusting dogs at the other end of the carrier, substantially as described.

12. The rotary carriage having a bolt-compartment and an actuator-compartment therefor containing a fly or trip, substantially as described, and a single plunger or actuator carried with said fly, said plunger adjustable to position to be inoperative, or to operate on a tilter, spalter or other adjunctive parts of the machine, in combination substantially as described.

13. The movable carriage or block-carrier having a single plunger moving synchronously with each block-compartment, said plunger adjustable to a plurality of positions, and when so adjusted being in position to actuate adjunctive parts of the machine, in combination with mechanism by which said plunger is adjusted, substantially as described.

14. The combination with the moving block-carrier of a single plunger or actuator to each bolt-compartment, and a latch engaging the same to retain it out of operative position and adjunctive parts of the machine in position to be engaged by said actuator.

15. The combination with the moving carrier, an actuating-plunger moving synchronously therewith, a latch for holding the plunger, and a trip controlled by the operator which trip may be thrown into position to engage the latch and adjunctive mechanism in position to be engaged by said plunger substantially as described.

16. The carrier, a vertically-moving plunger or actuator carried therewith, a sidewise-moving latch engaging said plunger to hold it up, and a trip movable by the operator to position to disengage said latch, whereby the plunger may drop to position to actuate an adjunctive part of the machine all combined substantially as described.

17. The block-carrier, a suitable movable actuator carried thereby for the purpose described, a spring-latch engaging said actuator, and a trip to disengage said latch from the actuator, in combination with an adjunctive part of the machine substantially as described.

18. The block-carrier, an actuator carried thereby and moving into a plurality of positions, and a tilt-head having an arm in position to be engaged by the actuator when the actuator is in one position, and a second arm movable so that it may be engaged by the actuator in any of its positions, substantially as described.

19. The tilt-table and connections therefrom to the tilt-head, a rocking tilt-head having two arms, and a carrier having an actuator movable into position to engage and shift said arms on the tilt-head substantially as described.

20. The combination of the tilt-table, its walking-beam, a link extending upward therefrom, a tilt-head, and a swinging arm connected to the tilt-head and having a cam engaging the link to move the walking-beam, substantially as described.

21. The combination of the tilt-table, connections therefrom to the tilt-head, a tilt-head having a plurality of arms rigidly connected thereto, so that one is swung in the path of the actuator when the other swings out, and an actuator movable into position to engage an arm of the tilt-head, substantially as described.

22. The combination with the rocking tilt-head having abutting surfaces at different elevations, of the bolt-carrier having a plunger adapted to engage one abutting surface of the tilt-head when the latter is swung, said plunger passing without engaging the tilt-head when the plunger is in normal position, substantially as described.

23. The combination with an adjunctive part of the machine of the carrier having a plunger, the latch for holding said plunger elevated, the trip under control of the operator for disengaging the latch, and an abutting surface which restores the plunger to normal position, substantially as described.

24. The combination of the rocking tilt-head having a plurality of abutting surfaces at different planes, a plunger on the carrier in position to ride over one abutting surface on the tilt-head when elevated, but to strike the same when depressed, an incline for raising this plunger, and a catch for releasing the plunger, substantially as described.

25. The combination with an adjunctive part of the machine of the carrier of the actuator moving therewith a latch engaging said actuator to retain it in one position, and a movable abutment outside the carrier and controlled by the operator, in position to engage said latch and move it longitudinally, substantially as described.

26. The combination with an adjunctive part of the machine of the carrier having a reciprocating plunger for the purpose described, of the spring-latch engaging said plunger to hold it elevated, an abutting surface on the frame in position to engage said latch when adjusted into position to do so, and a fixed abutment on the frame in position to engage said latch or not according to the position of the latch, substantially as described.

27. The combination with the frame having a plurality of tilt-heads, of the bolt-carrier, an actuator carried thereby, a trip by which the actuator is thrown into position to actuate one of the tilts, and an abutment in advance of second tilt by which the actuator may be restored to normal position, substantially as described.

28. The combination of the frame having two tilts, the block-carrier, the actuator moving therewith, the two movable trips under the control of the operator by which the actuator is released to operate one of the tilts, and an intermediate abutment by which the actuator is restored to normal position after acting on the first tilt, substantially as described.

29. The combination with the carrier having an actuator moving synchronously therewith, and adjunctive parts (as a spalter, tilter, or analogous mechanism) in position to be thrown into operation by said actuator, of a series of handles, treadles, or stops under control of the operator having trips whereby the actuator may be thrown into operative position, and abutments whereby the actuator is immediately restored to normal position after actuating either of the adjunctive parts of the machine, substantially as described.

30. The combination with the carrier, and the tilt or similar adjunct, of an operating-head having a plurality of engaging surfaces, one of which is in the path of the actuator when the tilt is in abnormal position, and an actuator which moves synchronously with the carrier and engages the head to restore the tilt or other adjunct to usual position whenever it is out of normal position at the passage of the carrier.

31. The combination of the moving carrier, the tilt, (or analogous adjunct) a tilt-head attached to or integral with a rock-shaft and having a plurality of engaging surfaces at different levels, and the actuator moving with the carrier in position to engage the lower engaging surface of the tilt-head when dropped, and to engage the upper surface when the same is in the path of the actuator whether the actuator be up or down, substantially as described.

32. The combination with the carrier, actuator, and catch engaging said actuator to maintain it on one of its positions, of a trip in the path of movement of said catch, a handle, and a rod connecting said trip to the handle.

33. The handle (as $h$) and rod connected thereto, a rocking trip to which the rod is connected, and a spring operating to hold said trip in operative position, in combination with the carrier and actuator moving therewith, substantially as described.

34. The operating-handle and its rod 151, the loop or hook 152 connected to said rod, the pivoted trip 156 having an arm with which said loop or hook engages in one position and an engaging surface with which the loop or hook engages to hold the trip in another position, in combination with the carriage and actuator, substantially as described.

35. The moving carrier having block-compartments, the actuator or plunger moving synchronously with each compartment, and the movable trip outside the carrier and movable to position to engage and shift the actuator, and to be engaged and shifted by the actuator, substantially as described.

36. The combination of the handle (as $h$) the rod 151 connected thereto, and having a loop or hook, the trip 156 having an arm with which said loop engages, and a plurality of surfaces, with one of which the loop engages when required, and a latch acted on by said trip, substantially as described.

37. The combination of the carriage, the actuator carried thereby, and adjunctive mechanism operated on by said actuator, the trip on the frame in position to move the actuator, an operating-arm near the outside of the machine, and a flexible connection, between the operating-arm and trip, substantially as set forth.

38. The combination of the tilt-table, its walking-beam, and the tilt-head, an arm connected to the tilt-head having upper and lower cam-faces, and a link pivoted to the walking-beam and having a projection engaging said cam-faces, all combined substantially as described.

39. The combination of the tilt-table, its walking-beam, and a pivoted link extending up from the beam and having a pin thereon, of a tilt-head and cam-arm connected thereto, said arm being closed at its sides to exclude sawdust, substantially as described.

40. The combination with the spalt-dropping ways, of a spring acting to close said ways, and a catch operating to retain them open against the action of the spring.

41. The combination of the self-closing spaltway, means to open the same, a stop serving to retain said way open, and an actuator moving with the carrier by which said stop may be released and the spalting-way closed.

42. The combination of the spaltway, means to open the same, a rock-shaft having a locking-abutment engaging some part of the spalt mechanism and by which the spaltway is kept open, and an arm on the rock-shaft in position to be engaged by an actuator on the first carrier which has an actuator adjusted to normal position, substantially as described.

43. The combination with the carriage-wheel having a number of bolt-compartments, of a spalting-way over which all the compartments pass, means for opening said way, and a catch acting to hold the spalting-way open while a plurality of block-compartments pass over the spalting-way, substantially as described.

44. The combination of the carriage having a number of block-compartments, a movable actuator for each compartment, a self-closing spalting-way and a catch therefor, said catch in position to be disengaged and release the spalter by any one of said trips which is in normal position, substantially as described.

45. The combination of the spalting-way, a catch retaining the same open, an arm connected to said catch to disengage the same, and a longitudinally-moving latch moving synchronously with each block-carrier, to disengage the catch when adjusted to position so to do.

46. The combination with the spalting-way and catch, of the carriage having a series of block-compartments, an actuator moving synchronously with each compartment, and a movable trip for each compartment, the actuator engaging a projection connected to the spaltway to open the same when so adjusted, and the lug acting to disengage the catch when adjusted so to do, substantially as described.

47. The combination with the rotating carriage wheel and frame, of a tilt-head on the frame provided with a lever and an abutment on each arm of said lever, and a plunger on the carriage set at an incline, so as to engage first one arm of the tilt-head and rock the second arm into the path of the plunger, and by engaging the second arm restore the tilt-head to normal position, substantially as described.

48. The combination with the rotating horizontal saw and the rotating block-carrier moving in a plane above the same, of a sawdust-spout opening toward the saw, and extending inwardly and bent downwardly toward the central part of the base of the machine, substantially as described.

49. The combination with the carriage of the vertically-sliding plunger, a latch engaging the same and having a longitudinal movement, a spring to press the latch toward the plunger, and an abutment on the latch acting as an adjunctive part of the machine, substantially as described.

50. The combination with the actuator carried by the carriage, of a latch for holding the same elevated, a trip on the frame in position to move said latch out of engagement, and a handle near the operator's table by which said trip may be set and remain set when the arm is released, substantially as described.

51. The combination with the tilt-table and walking-beam, of a link connected to the walking-beam, the tilt-head having a lever with two arms in line of movement of the actuator, a rock-shaft, and a cam-faced arm on the rock-shaft engaging the link of the walking-beam, all substantially as described.

52. The combination with the moving carrier of block-straighteners in the path of movement thereof, said block-straighteners engaging the blocks to straighten them in the dogs, substantially as described.

53. The combination with the traveling carrier and block-supporting ways, of block-straighteners in proximity to the ways, in position to engage the blocks and straighten them in the dogs.

54. The combination of the traveling carriage and block-supporting ways, of fingers in proximity to the ways extending into the path of the blocks, and a weight or equivalent controlling said fingers, substantially as described.

55. The sawdust-spout 310 having one side open so that the edge of the saw may enter said opening, the top and inner side of said spout curving downwardly, said spout being practically open at the bottom, and forming an open-bottomed guide, so that sawdust has no place of lodgment therein.

56. The combination with the piston-actuated block-pusher adjacent to the carriage and arranged to deliver the block upon or into a carriage-compartment, of the carriage, a trip on said carriage, and valve mechanism in the path of movement of the trip on said carriage, whereby the trip controls the admission of the medium to move the pusher, substantially as described.

57. The pusher and its actuating cylinder and piston adjacent to the carriage, the movable carriage in position to receive blocks from the pusher, the cylinder and piston by which the pusher is actuated, and an inlet-valve to said cylinder, and a trip connected to the carriage and controlling said inlet-valve, all combined substantially as described.

58. The combination of the moving block-carrier, the relatively-fixed block-pusher adjacent thereto, the pusher-actuating cylinder and piston, and an exhaust-valve, and mechanism in the path of movement of the pusher whereby the exhaust-valve is opened as the pusher about completes its stroke in feeding in the block, substantially as described.

59. The combination with the rotating carrier of the steam-cylinder, piston and block-pusher, a reversing-valve, and means whereby said valve is opened as the pusher about completes its stroke, substantially as described.

60. The steam-cylinder having a piston therein and a pusher connected to the piston, valves controlling the piston, the carriage and a trip thereon in position to control the admission of steam to the cylinder, and means connected to the reversing-valve in the path of movement of the pusher whereby the reversing-valve is controlled, substantially as described.

61. The combination with the arbor and bridge-pot, of a wedge by which the arbor may be raised, and a key-shaft engaging said wedge to move the same, and raise or lower the arbor, substantially as described.

62. The combination of the bridge-pot, the arbor-box therein, a step in the box and a wedge under the step, a key-shaft, and a crank on the shaft, and suitable engagement between it and the wedge, substantially as described.

63. The rotating carriage having bolt-compartments and an actuator and dogging-catch corresponding to each compartment, a dome covering the actuators, and hand-openings in the dome covered by separate plates corresponding to each compartment.

64. The combination with the saw rotating in a horizontal plane, of a sawdust-spout open at the side next the saw and at the bottom, but closed at the top, substantially as described.

65. The combination with the saw which rotates in a horizontal plane, of the sawdust-spout open at the bottom and side toward the saw, closed at the top and side away from the saw, and having its top curved downwardly to guide the sawdust from a horizontal to a downward direction, substantially as described.

66. The combination with the bolt pusher or feeder, of a trip carried by the moving carrier, and adjustable to position to operate the pusher, and means connecting the trip and pusher, whereby the trip throws the pusher into operation at a predetermined time, substantially as described.

67. The combination with the shingle-bolt carriage or carrier, of a dividing-partition extending a little way into the carrier from each end, and holding-dogs working independently at each side of said partitions.

68. The combination with the carriage or carrier described, of dividing-partitions which extend a little way into the carriage from the ends, an equalizing-bar at one end extending past the partition, and separate dogs at the sides of the partitions carried by said equalizing-bar.

69. The combination with the carriage and actuator, and adjunctive mechanism operated on by said actuator, the handle, (as $h$, $i$, or $m$,) a rod extending from said handle toward the center of the machine, a trip-lever operated by said rod, and a spring operating on the rod to restore the handle to normal position, substantially as described.

70. In a shingle-sawing machine, a rotary carrier and a trip carried thereby, an actuator in position to engage said trip when set to do so, a rod extending out from the actuator, a handle connected to the rod, and a treadle flexibly connected to the rod, whereby the handle may be moved without moving the treadle, substantially as described.

71. The combination with the handle (as $m$) and a connecting-piece extending therefrom to the trip or actuator, substantially as described, of a retaining-catch by which said handle may be held in operative position until a series of block-carriers pass the handle substantially as described.

72. The combination with a shingle-sawing machine, of an arm in the path of movement of a block or bolt which assumes an abnormal position, a train of operative connections from said arm and a gear-shifter or equivalent device by which the machine is stopped, substantially as described.

73. The combination with a shingle-sawing machine having a spalt-dropper, or an arm in proximity to said dropper in position to engage a block in abnormal position at the dropper, and a shifting-train connected to said arm and to the driving-gear, whereby the machine may be stopped by the block when out of proper position, substantially as described.

74. The combination with the moving carriage having a spalt-dropper, of an automatic stop near the spalt-dropper, said stop operating on the driving-gear to stop the carriage movement, substantially as described.

75. The combination with the moving carriage and movable spaltway, of a rock-shaft near said way, an arm extending from the same into the path of a block which may project from the carriage or spaltway out of proper position, and a train of levers connecting said arm to the driving-gear of the carriage, whereby the carriage may be stopped automatically, substantially as described.

76. The combination with the frame having two tilt-heads, of the bolt-carrier, an actuator carried thereby, a trip by which the actuator is thrown into position to actuate one of the tilts, and an abutment by which the actuator is immediately restored to normal position, substantially as described.

77. The combination of the spalting-way, a catch retaining the same open, an arm connected to said catch to disengage the same, and a sliding bolt corresponding to each block-carrier, to disengage the catch when the bolt is adjusted to position so to do.

78. The combination with the carriage of the vertically-sliding plunger, a latch engaging the same, a sliding bolt connected to the latch, a spring bearing on the latch and bolt to press the latch toward the plunger, and an abutment on the bolt acting as an adjunctive part of the machine, substantially as described.

79. In a shingle-machine the combination with a plurality of horizontal saws and a rotary carriage or carrier moving over said saws, of a sawdust-spout for each saw, each spout having a top extending inwardly generally toward the center and downward toward the base of the machine, and sides connected to said top for the sawdust to impinge against, substantially as described.

In testimony whereof I affix my signature in presence of two witnesses.

WILLIS J. PERKINS.

Witnesses:
CLINTON L. DAYTON,
HARRY P. VAN WAGNER.